UNITED STATES PATENT OFFICE.

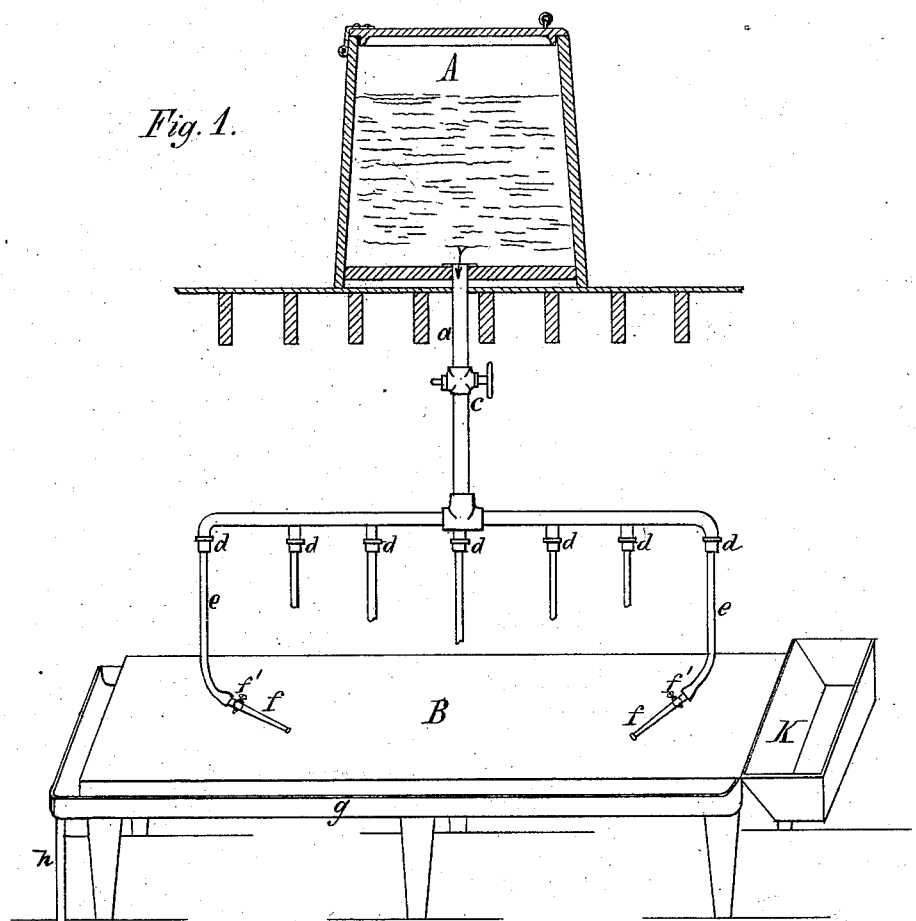

JOHN L. ALBERGER, OF BUFFALO, NEW YORK.

IMPROVEMENT IN PROCESSES FOR PRESERVING FLESH.

Specification forming part of Letters Patent No. 194,569, dated August 28, 1877; application filed April 16, 1877.

*To all whom it may concern:*

Be it known that I, JOHN L. ALBERGER, of the city of Buffalo, in the county of Erie and State of New York, have invented certain new and useful Improvements in Process for Preserving Flesh for Food, which improvements are fully set forth in the following specification, reference being had to the accompanying drawing.

My invention relates to the process of preserving flesh for food by injecting a saline solution into the vascular system of the carcass.

The mode or process of injecting the carcass simply with a saline solution is, however, imperfect and unreliable for curing meat for the market in the following particulars: The saline solution injected into the arteries and capillaries constringes the tissues, and thereby prevents the marrow-bones and harder cartilages from receiving the necessary quantity of saline solution to fully cure the same, which frequently causes the marrow-bones, cartilages, and adjacent parts to run into decomposition, either in smoking or afterward. The albuminous juices, which are very apt to putrefy, are drawn out of the meat by the ordinary process of salting or pickling, while the process of injection leaves a portion of these juices in the meat, without curing them, whereby the meat so preserved is rendered liable to sour or run into decomposition after a greater or less length of time, according to the degree of heat to which it is exposed.

The object of my invention is to remedy these difficulties; and it consists, principally, in injecting the carcass to be cured or any portion thereof with a saline solution containing carbolic or salicylic acid, whereby the albuminous juices contained in the tissues are coagulated or fixed, thereby rendering the said juices incapable of decomposition, and increasing the nutritive and market value of the cured meat correspondingly.

My invention consists, further, of various successive steps or operations for curing flesh for food by means of the said solution.

The nature of my invention will be fully understood from the following description:

In the accompanying drawing, Figure 1 represents the apparatus used for injecting the carcasses. Fig. 2 represents a knife for opening the breast of the animal.

The animal is preferably killed by a blow on the head, and the carcass prepared for injection by opening the chest and forming openings in both sides of the heart.

The carcass is then injected with a saline solution, compounded substantially of the following ingredients and in the following proportions: To one gallon of water I take three pounds of salt, eight ounces of sugar, two ounces of saltpeter, and crystallized carbolic acid in the proportion of half an ounce of this acid to about one hundred and twenty gallons of brine. Instead of the carbolic acid, a proportionate quantity of salicylic acid may be employed. The carcass or any portion thereof to be cured is injected with this solution under a hydrostatic head of about eight feet, whereby the blood and other matter contained in the vessels is expelled therefrom and the tissues thoroughly permeated by the solution. The carbolic or salicylic acid contained in the latter has the effect to fix or coagulate and retain in the tissues the soluble albuminous juices, which amount to from three to five per cent. of the weight of the animal. The juices, after having been under the influence of the carbolic or salicylic acid, are no longer putrefactive, while they are of great nutritive valve. In the ordinary processes of salting or pickling meat these juices are drawn out by the salt or brine and wasted, while in curing by injection a portion of these juices is retained in the tissues, but in a liquid or putrefactive state, and a portion of these juices drains off when the carcass is cut up.

I have found, from experience, that meat cured by injecting with a saline solution containing carbolic or salicylic acid weighs about five per cent. more than meat treated in the ordinary manner, and that such meat does not part with its juices when packed in dry salt or brine, or by drainage from the surfaces of the meat when cut up. The flesh, under the effect of the saline solution, becomes constringed and hardened, and prevents the finer veins which feed the bones and cartilages from carrying the necessary supply of solution to these parts to permanently cure the same.

In order to prevent the marrow-bones and harder cartilages from running into decomposition before they have had time to absorb the salt and other preservatives from the surrounding tissues, the meats, injected as above described, are next subjected to a refrigerating temperature in any suitable compartment. The tissue being thoroughly infiltrated with the preservative ingredients of the saline solution, while the marrow-bones and harder cartilages are yet in the fresh state, the preservatives are gradually absorbed by the bones and cartilages by the process of endosmose and exosmose, until all the parts contain a uniform quantity of the preservative.

The time required to complete this process differs with different pieces, according to the thickness and hardness of the bones and cartilages contained therein, fifteen days being sufficient for pork hams and shoulders, three to five days for sides, and three days for breasts and bellies. The parts so treated are permanently cured, and may then be smoked or packed for shipment, as may be required.

The process of injection infiltrates the preservatives into all parts of the carcass alike. This is to a certain extent objectionable, as by employing a solution of full saturation the hams and breakfast-bacon will be too salt, while the shoulders and sides will be properly cured; or by employing a solution of two-thirds saturation the hams and bacon will be lighter cured, but the sides and shoulders would require more salting. To obviate this difficulty I immerse such portions of a fully-salted carcass as require to be lightly cured in a brine of less strength, or such portions of a lightly-salted carcass as require more salt in a brine of greater strength, or pack them in dry salt, whereby in the first case the excess of salt is withdrawn from the meat, while in the latter case the deficiency is supplied. The albuminous juices being fixed in the tissue, the immersion of the meat does not operate to withdraw the juices therefrom.

As the hams and bacon constitute only about one-fifth of the weight of the hog, I prefer to inject the carcass with a brine of full saturation, and then withdraw the excess of salt from the hams and bacon, as above described. The brine, being injected at full saturation, issues from the carcass at about one-half strength, and carries with it blood and other soluble matter. This spent brine, I subject to a temperature of about 140° Fahrenheit, or upward, whereby the coagulable portions of the blood will be separated from the brine, leaving the latter clear. The spent brine, after being so treated, still contains some nutritious matters, which it has absorbed in its passage through the carcass, and which serve to give the meat placed in the brine a fine and glossy appearance. For this reason I prefer to use this brine for the immersion of the injected meat.

The refrigeration and immersion may take place simultaneously, thus permitting the meat to be perfectly cured in about one-half the time ordinarily consumed, as the withdrawal by immersion of the excess of salt in the tissues can go on while the curing of the bones and cartilages from the adjacent flesh takes place.

The immersing of the flesh, as above described, has the advantage that the salt may be withdrawn from the fully-salted parts to any desired extent to suit the tastes of consumers and the requirements in any market.

The leaf-lard, fat, and trimmings are all salted, which is unobjectionable when the lard is rendered by steaming; but when it is rendered in a fire-kettle it will have to be soaked in water about twelve hours before placing it in the kettle.

The flesh-trimmings, being mostly from the hams and shoulders, are packed closely in a cotton-cloth bag of the size of a ham-bag, tied up, and smoked four or five days, then boiled in water about four hours, cut fine in the sausage-machine, salted to taste, if needed, and packed in buckets or air-tight cans, to be used for sandwiches, or as a relish.

The advantages of my improved process are the great rapidity and certainty with which meats are cured thereby, as on an average about one-half of the time ordinarily consumed in curing is saved by my improved process. Furthermore, the meat treated by the same gains in weight over meat cured in the ordinary manner about five per cent., as well as an equivalent amount of nutritive value, and the meat so treated is harder than ordinary meat, so that it does not drain off under pressure, while it loses less weight by smoking and gains more by the subsequent pickling than fresh meat.

I will now proceed to describe the apparatus represented in the accompanying drawing for carrying out my improved process.

A represents the brine-receptacle, and B a table or bench, preferably made slightly inclined, on which the carcasses are placed for injection. The brine-receptacle is arranged about eight feet above the table B, and provided with a pipe, $a$, depending from the bottom of the receptacle A, and running horizontally or slightly inclined along the table B, about six feet above the latter. The pipe $a$ is provided with a stop-cock, $c$, and its horizontal portion is provided, at intervals of about one foot, with nipples $d$, to which are connected rubber pipes $e$ of suitable length. $f$ represents a faucet, secured to the end of each rubber pipe, and having a long nozzle and a stop-cock, $f'$. $g$ represents an inclined gutter or trough, arranged on one or more sides of the table B, for receiving the spent brine, and $h$ a discharge-pipe, arranged in the lowest portion of the gutter $g$, for conveying the brine to a receptacle, I. K represents the scalding-vat, arranged at the upper end of the table B.

The hog being killed by a blow on the head, it is either laid on its back and bled by opening the heart, or a chain is fastened around its hind leg and it is hoisted to a sliding bar, when its breast is opened by means of a knife, L, provided at its point with a sharp conical knob, l, as represented in Fig. 2. With this instrument an incision is made at the posterior of the sternum or breast-bone, in or near the middle thereof, when the knife is drawn downward and outward, the conical knob bearing against the inner side of the breast-bone. By striking a few blows on the back of the knife the breast-bone is cut without injuring any of the larger arteries or veins. This operation exposes the heart, which is now opened on one or the other side, so as to bleed the hog. After hanging a few minutes the hog is placed in the scalding-vat K, and afterward unhaired on the table B in the ordinary manner. If desired, the bleeding may be postponed until the unhairing is accomplished. The hog is then placed on the table B, with the head over the trough side thereof, when one of the wooden faucets $f$ is inserted into the arterial side of the heart, through the hole made in bleeding if in that side; if not, an incision is made for the purpose. The faucet is so inserted that the end of the nozzle will just enter the aorta, when the faucet is secured in place by a string passed tightly around the aorta and pulmonary vein and nozzle of the faucet. The stop-cock $c$ being open, the cock $f'$ of the faucet is now opened, when the saline solution will enter the vascular system of the carcass under treatment, and, following the arteries, capillaries, and veins, will return to the heart through the vena cava, and issue from the opening made in that side of the heart connecting with the vena cava. The portion of the brine first issuing from the heart contains a great deal of blood and other impurities, and is allowed to waste. After a few seconds the brine becomes clear, and this is collected by the gutter $g$, and conveyed by the pipe $h$ to the receiver I.

Ordinarily about six gallons of saline solution are used for each hog, and the solution is allowed to flow through until the hams stiffen up and the shoulders feel hard and solid through the skin.

When a large number of hogs are slaughtered and salted daily a second bench or table may be arranged alongside of the first one, so that one table may be filled with hogs while the other is being emptied. After the carcass is injected it is disemboweled and cut up in the usual manner.

The saline solution is preferably injected at the ordinary temperature of the water, except in very cold weather, when it may be warmed by a steam-jet. A temperature of about 50° Fahrenheit in summer will be about right.

The saline solution, flowing through the vascular system, cools the carcass from the inside outward, thereby effecting a large saving in ice in packing-houses, in which the hogs are run directly into the ice-house after being killed.

It is obvious that my improved process is also applicable to beef and other animals which are cured and salted for the market.

Having thus fully described my invention, what I claim as new, and desire to secure by Letters Patent, is—

1. The process of preserving flesh for food by injecting the carcass, or any portion thereof, with a saline solution containing carbolic or salicylic acid, substantially in the proportion specified, whereby the albuminous juices are fixed and their decomposition prevented, while the nutritive and market value of the meat is correspondingly increased, substantially as hereinbefore set forth.

2. The process of preserving flesh for food by first injecting the same with a saline solution, then subjecting the injected meat to a refrigerating temperature for curing the bones and cartilages, and then immersing the injected meat in brine of suitable strength for withdrawing from the injected meat any excess or supplying thereto any deficiency of salt, substantially as and for the purpose hereinbefore set forth.

3. The process of immersing the injected meat for finally curing the same in the saline solution, which has passed through the carcass, after the saline solution has been heated, so as to separate the coagulable matters from the solution, substantially as and for the purpose hereinbefore set forth.

4. The process of treating the injected flesh-trimmings by packing the same in bags, smoking them, then boiling the same in water, and packing them in air-tight cans, substantially as and for the purpose hereinbefore set forth.

JOHN L. ALBERGER.

Witnesses:
GEO. S. WILSON,
M. W. SHEEHAN.